(No Model.)
G. R. YOUNG & C. SHAW.
WATER RAISING APPARATUS.
No. 592,037. Patented Oct. 19, 1897.
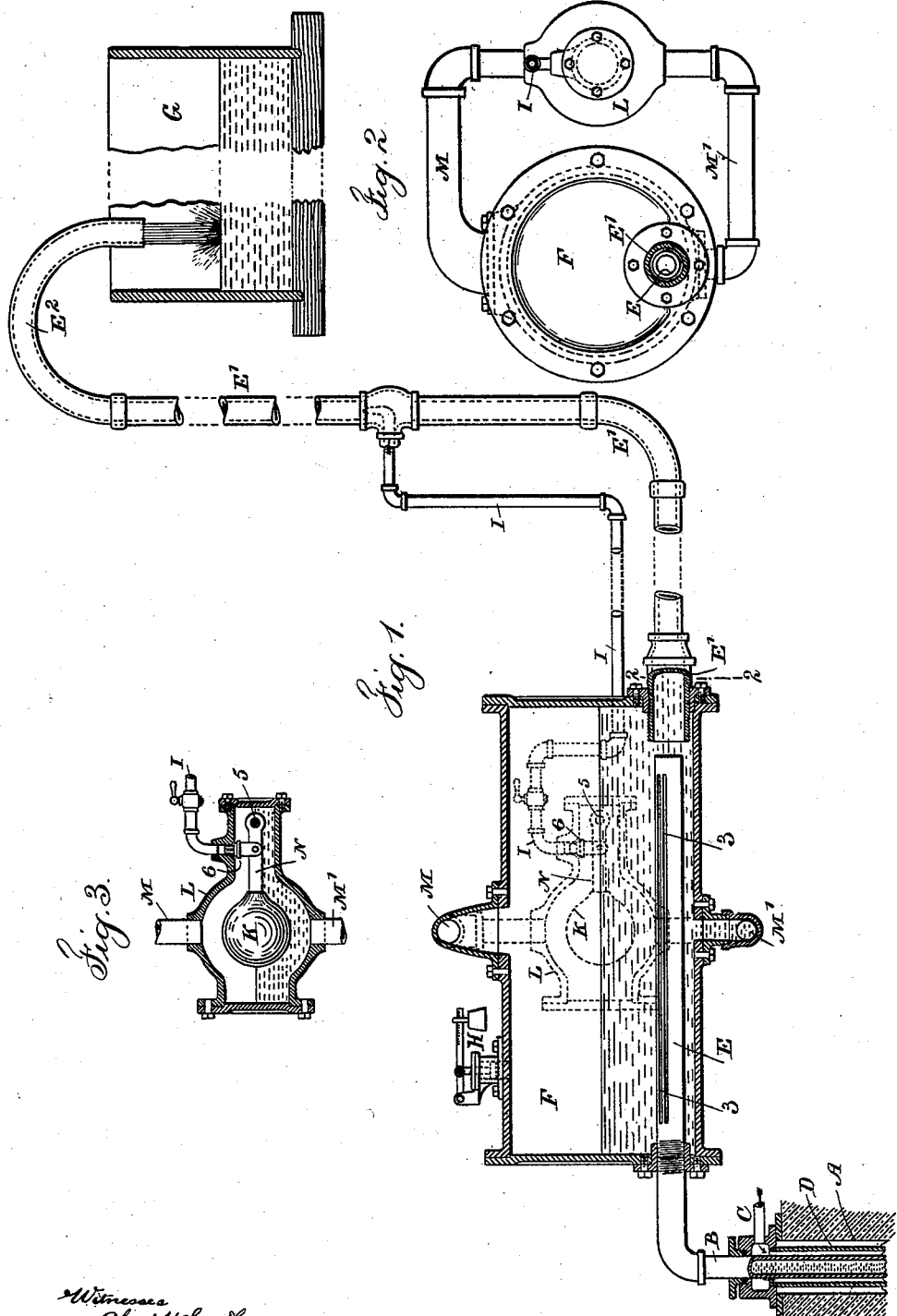

UNITED STATES PATENT OFFICE.

GEORGE R. YOUNG, OF RIDGEWOOD, NEW JERSEY, AND CLIFFORD SHAW, OF NEW YORK, N. Y.

WATER-RAISING APPARATUS.

SPECIFICATION forming part of Letters Patent No. 592,037, dated October 19, 1897.

Application filed November 29, 1895. Renewed August 20, 1897. Serial No. 648,958. (No model.)

*To all whom it may concern:*

Be it known that we, GEORGE R. YOUNG, of Ridgewood, in the county of Bergen and State of New Jersey, and CLIFFORD SHAW, of the city of New York, in the county and State of New York, citizens of the United States, have invented an Improvement in Water-Raising Apparatus, of which the following is a specification.

Several devices have been patented and publicly used in which air under pressure is forced down to the bottom of a well and escapes into an uptake-pipe into which also the water is admitted, the bubbles of air rendering the column of water sufficiently light for the same to rise to the place of delivery, but in some instances the place of delivery is at a distance from the mouth of the well and the water has to travel through a pipe that is horizontal, or nearly so, previous to reaching the place of delivery. We have found that when this last-named condition exists the bubbles of air, which have been nearly uniformly distributed in the rising column of water, come together in the upper part of the nearly horizontal pipe, and so check and interfere with the movement of the water that a much larger pipe has to be employed to prevent the flow of water being stopped.

Our present invention provides for separating the air from the water as it flows horizontally, or nearly so, and also for using any pressure of air that may remain after the water has reached the surface of the earth for the final delivery of the water at the desired elevation.

In the drawings, Figure 1 is a side view, partially in section, of the apparatus made use of by us; and Fig. 2 is a cross-section at the line 2, and Fig. 3 is a section of the vessel holding the float.

The well and the water-elevating device may be of any desired character. We have represented the upper part of the well at A and the uptake-pipe at B, and the air is supplied by a pipe C to the annular space between the uptake-pipe B and the descending air-pipe D. The construction of the water-elevating apparatus, however, may be of any desired character, and the pressure of atmosphere employed is to be sufficient to elevate the water from its level in the well to the desired place of ultimate delivery. A bend or elbow is made use of for connecting the upper end of the uptake-pipe B to the pipe E, that is horizontal, or nearly so, and through which the water and the air are discharged, and this pipe E passes into the air vessel F, and has longitudinal slots or holes at 3, through which the atmosphere can escape freely from the water flowing along in such pipe E, and the surrounding air vessel F is of any desired size or shape, and the end of the pipe E advantageously terminates opposite the open or enlarged end of the pipe E', that passes out from such air vessel F, and is led to the place of final delivery of the water. We have shown a gooseneck or return-bend E², through which the water is delivered into a suitable reservoir G. It will now be understood that air will accumulate within the vessel F and the pressure will ultimately become sufficient to raise the water in the pipe E' and E² sufficiently for the discharge of the water at the ultimate place of delivery, the pressure of air acting within the well being sufficient to raise the column of water to such point of ultimate delivery, but there will be a continual accumulation of air in the vessel F, and the same will require to be blown off constantly by a cock or air-discharge and pressure regulator, (illustrated at H,) but in so doing there will be a loss in the power represented by the pressure of the escaping air from the vessel F. We therefore avail of this power in lifting the water to its place of ultimate delivery, and to effect this object the air-pipe I passes from the air vessel to the ascending portion of the pipe E' and enters the same, so as to aerate and lighten the column of water between the place of admission of the air and the ultimate discharge of the water, and by regulating the escape of the air through the pipe I by a cock or otherwise the necessary pressure will be maintained in the vessel F for the proper use in forcing the air into the water in the rising column, so that by this feature of the present improvement the water will flow in a substantially solid column from the place of delivery near the mouth of the well to the place at which air is admitted in the rising column from the pipe I, and the air will be used to aerate the column of water and aid in its ultimate delivery, and the pressure of air made use of will correspond to the pressure upon the bubbles of air in the column of water of the uptake-pipe, as the air and water are delivered through the horizontal pipe E, and the inertia of the water in the pipe E will aid the flow of the water through such pipe E and through the pipe E', as these two pipes are in line, as shown in Fig. 1.

We sometimes prefer to make use of an automatic device for regulating the action of the air in the vessel F and the escape of the same into the air-pipe I, and with this object in view a float K is provided, preferably in a separate vessel L, adjoining the air vessel F and connected with the same by upper and lower pipes M M', and this float K is on a lever N, pivoted at 5 and provided with a valve 6 at the opening into the pipe I. Hence when the apparatus is set in work and the air vessel F is empty the water will be discharged through the uptake-pipe of the well and the pipe E into the air vessel F, and the air will rise in such vessel and water will also accumulate in this vessel as well as flowing on through the pipe E', and the float K will be lifted and the valve 6 close the outlet for the air, and the pressure of air will accumulate until the level of the water has been forced down sufficient for the float to descend and open the valve 6, and the parts are to be so proportioned that by this time the water in the pipe E' will have reached the level of the end of the air-pipe I, and the further addition of water into the vessel F and of air will cause the water to rise in the pipe E' and the air to act simultaneously in aerating the same and carrying such water to the point of discharge into the reservoir or suitable holder.

By this improvement the difficulty experienced from the presence of air in the horizontal or nearly horizontal pipe in the compressed-air apparatus for raising water is avoided, and the best results obtained when the parts are properly proportioned, having respect to the entire column of water to be lifted, the depth of the well, and the pressure of air made use of.

By the present improvement we are enabled to dispense with a reservoir or tank above the well for receiving the water at the desired elevation, because the pipe E' can be carried along at or near the surface either horizontally or with an upward or downward inclination to any desired distance and the water in this pipe will be free from air and be elevated to its ultimate point of delivery by the pressure of air that is maintained in the vessel F or by the action of air that is allowed to pass from the same through the pipe I and act to aerate the rising column of water at the place of discharge. Under all circumstances the air is to be allowed to escape from the vessel F progressively, so that the air may not pass along with the water in the pipe E'.

In the present improvement an active and useful pressure is maintained in the vessel F, so that this pressure raises the water between the vessel and the place of delivery, and the rising column of water only requires to be slightly less in pressure than the pressure of the air in the vessel F, so that the pressure of the air continues to deliver the water at the higher elevation. In addition to this the mechanism which automatically regulates the discharge of the air is controlled by the height of the water. Hence the useful pressure in the vessel F is maintained for effecting additional work upon a column of water, and the air that is discharged under a pressure is availed of for aerating the column of water, and thereby there is little or no loss of power, because the power stored up in the air under pressure is availed of for raising the water.

We claim as our invention—

1. The combination in a water-raising apparatus, of a descending pipe through which air under pressure is passed, an uptake-pipe in which the water is raised by the action of the air, a vessel near the upper part of the uptake-pipe into which the air and water pass, and in which vessel the air separates from the water by gravity, a pipe extending out from the lower part of this air vessel to a higher elevation for ultimate delivery of the water by the pressure of the air in the air vessel, and means for regulating the escape of surplus air, substantially as set forth.

2. The combination with the uptake-pipe in an apparatus for raising water by air under pressure, of a nearly horizontal pipe having openings in the same for the escape of the air, a surrounding air vessel and a pipe extending out from such air vessel and in line with the perforated pipe for conveying the water to the place of ultimate delivery, whereby the air is separated from the water which flows horizontally or approximately so, an air-pipe leading from the air vessel to the rising pipe for aerating the column of water previous to its final delivery, substantially as set forth.

3. The combination with the uptake-pipe in an apparatus for raising water by air under pressure, of a nearly horizontal pipe having openings in the same for the escape of the air, a surrounding air vessel and a pipe extending out from such air vessel and in line with the perforated pipe for conveying the water to the place of ultimate delivery, whereby the air is separated from the water which flows horizontally or approximately so, an air-pipe leading from the air vessel to the rising pipe for aerating the column of water previous to its final delivery and a valve or cock for regulating the discharge of the air through such pipe, substantially as set forth.

4. The combination with the uptake-pipe in an apparatus for raising water by air under pressure, of a nearly horizontal pipe having openings in the same for the escape of the air, a surrounding air vessel and a pipe extending out from such air vessel and in line with the perforated pipe for conveying the water to the place of ultimate delivery, whereby the air is separated from the water which flows horizontally or approximately so, an air-pipe leading from the air vessel to the rising pipe for aerating the column of water previous to its final delivery, a float and valve for regulating the air passing from the air vessel through such air-pipe, substantially as set forth.

5. The combination with the uptake-pipe in an apparatus for raising water by air under pressure, of a nearly horizontal pipe having openings in the same for the escape of the air, a surrounding air vessel and a pipe extending out from such air vessel and in line with the perforated pipe for conveying the water to the place of ultimate delivery, whereby the air is separated from the water which flows horizontally or approximately so, an air-pipe leading from the air vessel to the rising pipe for aerating the column of water previous to its final delivery, a float and valve for regulating the air passing from the air vessel through such air-pipe, a separate vessel for containing the float, and pipes extending from the same to the air vessel above and below the water-level, substantially as set forth.

6. The combination in a water-raising apparatus, of a descending pipe through which air under pressure is passed, an uptake-pipe in which the water is raised by the action of the air, a vessel near the upper part of the uptake-pipe into which the air and water pass, and in which vessel the air separates from the water by gravity, a pipe extending out from the lower part of this air vessel to a higher elevation for ultimate delivery of the water by the pressure of the air in the air vessel, and automatic mechanism for maintaining the water at a regular height in the air vessel by allowing the discharge of the surplus air, substantially as set forth.

7. The combination in a water-raising apparatus, of a descending pipe through which air under pressure is passed, an uptake-pipe in which the water is raised by the action of the air, a vessel near the upper part of the uptake-pipe into which the air and water pass, and in which vessel the air separates from the water by gravity, a pipe extending out from the lower part of this air vessel to a higher elevation for ultimate delivery of the water by the pressure of the air in the air vessel, and automatic mechanism for allowing the escape of air, and a pipe for conveying such escaping air to a column of water for aerating the same, substantially as set forth.

Signed by us this 26th day of November, 1895.

GEO. R. YOUNG.
CLIFFORD SHAW.

Witnesses:
  GEO. T. PINCKNEY,
  S. T. HAVILAND.